March 23, 1965 R. X. MEYER 3,174,537
ELECTROMAGNETIC RADIANT ENERGY RESPONSE APPARATUS
Filed June 30, 1959 2 Sheets-Sheet 1
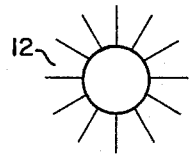
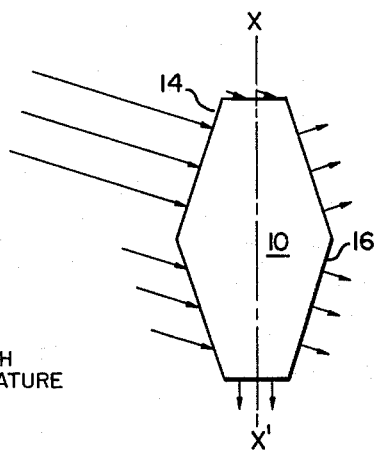
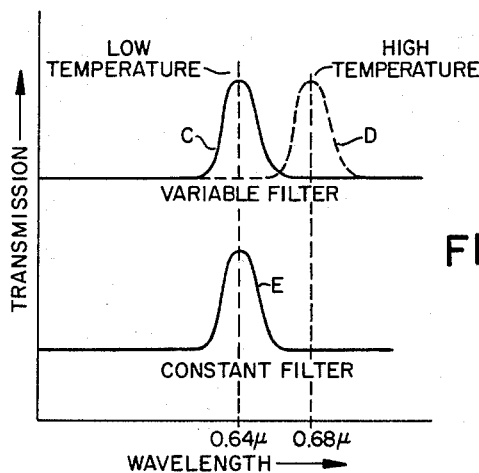
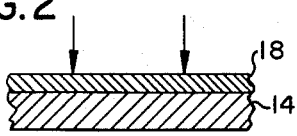
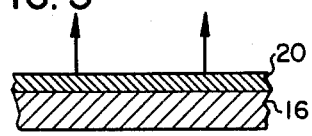
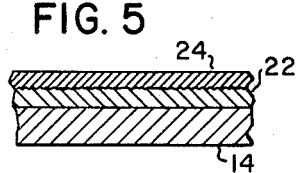
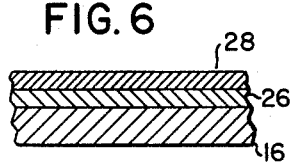
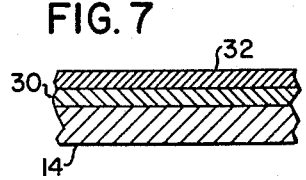
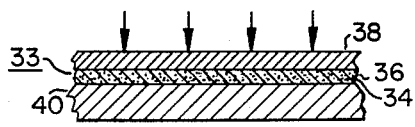
INVENTOR.
RUDOLF X. MEYER
BY Jerry A. Dinardo
AGENT
Albert Rosen
ATTORNEY March 23, 1965 R. X. MEYER 3,174,537
ELECTROMAGNETIC RADIANT ENERGY RESPONSE APPARATUS
Filed June 30, 1959 2 Sheets-Sheet 2

INVENTOR.
RUDOLF X. MEYER
BY Jerry A. Dinardo
AGENT
Albert Rosen
ATTORNEY

United States Patent Office 3,174,537
Patented Mar. 23, 1965

3,174,537
ELECTROMAGNETIC RADIANT ENERGY
RESPONSE APPARATUS
Rudolf X. Meyer, Pacific Palisades, Calif., assignor, by mesne assignments, to Thompson Ramo Wooldridge Inc., Cleveland, Ohio, a corporation of Ohio
Filed June 30, 1959, Ser. No. 824,109
18 Claims. (Cl. 165—30)

This invention relates generally to the art of electromagnetic radiation response, and more particularly to apparatus involving automatic changes in the radiative characteristics of a body in response to its temperature. As used herein, the radiative characteristics of a body refer to such properties as the absorptivity, emissivity, reflectivity, and transmissivity of the body with respect to radiant energy received by or emitted from the body. While not limited thereto, the invention will be described herein as embodied in an apparatus useful in connection with controlling the temperature of a body by controlling its radiative characteristics.

In some applications it is desirable to maintain the temperature of a body within a narrow range even though the body is exposed to wide variations in incident radiant energy. In the case of a space vehicle, for example an artificial satellite body exposed to the sun, the body reaches a temperature state of equilibrium when its rate of radiation absorption is equal to its rate of radiation emission. The state of equilibrium can change if there is a change in either the rate of radiation absorption by the body or the rate of radiation emission from the body. Such changes may be brought about by changes in the attitude of the body with respect to the sun, changes in distance from the sun, changes in smoothness of the body surface due to erosion by meteoric dust, or changes in the length of time spent by the body in the shadow of a planet.

Some of the present methods of controlling the temperature of a satellite body involve the painting of patterns on the body, with the absorption-emission characteristics being determined by the pattern used. Such purely passive control means have not proven entirely satisfactory because they must be based on a preselected, calculated environment and hence are incapable of maintaining the body at a substantially constant temperature if this environment changes or if the calculations were in error. On the other hand, active control systems are known which use some form of a shutter mechanism to control the passage of the electromagnetic radiation energy to a surface on an artificial satellite. Since most devices involving mechanical movement require a source of electric power, are relatively weighty and bulky, and are usually subject to malfunction, such active systems have not met with complete approval.

Accordingly, it is an object of this invention to provide an improved means for enabling a body to respond to changes in environmental radiant energy conditions by the exhibition of different radiative characteristics.

Another object of the invention is the provision of an improved means for automatically controlling the temperature of a body exposed to wide variations in incident radiant energy.

A further object is to provide improved active temperature control means for a space vehicle body, and wherein the control means does not require any electrical or mechanical power source and adds negligible weight to the body.

This invention is predicated upon the properties of certain materials wherein the electromagnetic radiative characteristics of the material change with changes in temperature.

In accordance with the invention the foregoing and related objects are realized by thermally coupling a body (whose characteristics are to be controlled in spite of, or in response to, changes in environmental radiant energy conditions) to an element or material whose radiative characteristics change with temperature. Thus, for example, if it is desired that a body be maintained within a specific, narrow temperature range in spite of being subjected to wide variations in incident electromagnetic radiation, the body is coated with a material that exhibits a predetermined radiative characteristic. This characteristic, based on the desired temperature range, is such that the material exhibits a greater absorption of electromagnetic radiation when the material is at a temperature below the desired temperature range than when the material is at a temperature higher than the desired temperature range. Alternatively, the material may have a characteristic such that it exhibits a substantially and markedly greater emissivity of electromagnetic radiation when the material is at a temperature above the desired temperature range than when the material is at a temperature below the desired temperature range.

In accordance with the invention, the surface of the body (for example a space vehicle whose temperature must be maintained within a narrow range but which is exposed to wide variations in incident electromagnetic radiant energy) is thermally coupled to an element, such as a surface coating, of a type whose radiative characteristics change with temperature. The properties of the coating are such that when it changes in temperature, it changes its radiant energy absorptive, emissive, reflective, or transmissive characteristics in a manner counteracting the temperature change.

Thus, in one embodiment, the coating is applied to those surfaces of the vehicle which are oriented to face the sun. If the temperature of the vehicle rises above the coating transition temperature, the coating changes its radiant energy absorption properties so that the absorption of solar incident electromagnetic radiation is decreased. Accordingly, the total energy input from the radiation to the entire vehicle (by thermal conductivity from the surfaces facing the sun to the rest of the vehicle) is decreased and the temperature rise of the vehicle is drastically limited. The heat dissipation from other surface portions of the vehicle not facing the sun will tend to reduce the vehicle temperature. In this embodiment the coating has a reversible radiative characteristic. Consequently, when the temperature of the vehicle decreases below the transition temperature, the coating reverts to its original form and its high radiant energy absorption characteristic. This increases the absorption of incident electromagnetic radiation from the sun, and hence tends to increase the temperature of the vehicle. Thus the effect of the coating is to regulate the temperature of the vehicle within a relatively narrow temperature range.

In a second embodiment an opposite type of coating is used. This opposite coating has a radiative characteristic that is opposite to that of the coating described above, and is applied to those portions of the vehicle which do not receive incident electromagnetic radiation from the sun. This opposite coating has properties such that the emissivity of the coating increases with increasing temperature. This increased emissivity increases the heat dissipation from the vehicle and tends to cause the temperature of the vehicle to decrease. When the temperature of the vehicle decreases below the transition temperature of the opposite coating, the opposite coating reverts to its original state of low emissivity; this limits the heat dissipation from the vehicle and causes an increase in the vehicle temperature. Thus the effect of this opposite coating is also to regulate the temperature of the vehicle within a relatively narrow range.

This latter type of coating can also be utilized to control the temperature of a body in which heat is generated internally, such as from electrical or chemical devices within the body, whether or not such a body is in an incident electromagnetic radiation field.

In other embodiments coatings may be used which change their transmissivity or reflectivity with temperature, so as to vary the radiant energy incident upon the surface on which they are applied.

In the drawing:

FIG. 1 is a schematic view of a body, such as a space vehicle, provided with temperature responsive surface coatings for maintaining the temperature of the body uniform within a narrow range in accordance with the invention;

FIG. 2 is an enlarged fragmentary sectional view showing in greater detail a portion of the body of FIG. 1;

Figure 4:
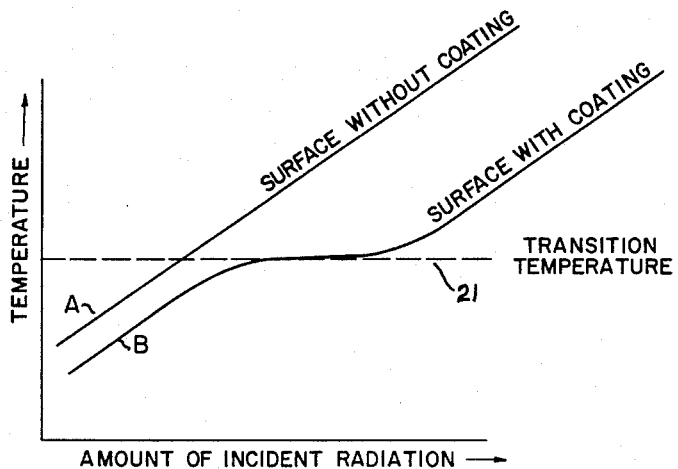
Figure 10:
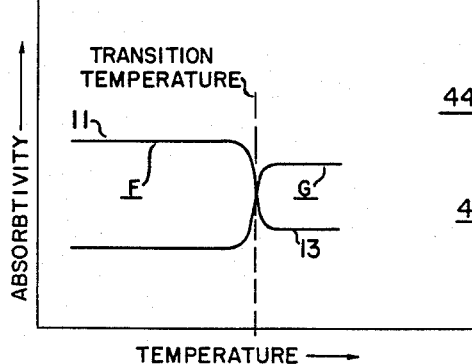
Figure 12:
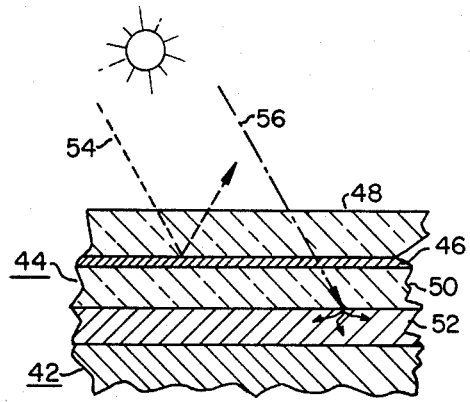
Figure 11:
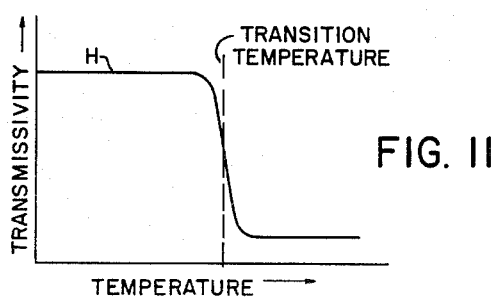

FIGS. 3, 5, 6, and 7 are enlarged fragmentary sectional views of the body of FIG. 1 showing other forms of temperature responsive coatings useful in practicing the invention;

FIG. 4 is a graph showing the variation in temperature of a body as a function of incident radiant energy;

FIG. 8 is a fragmentary sectional view of a portion of a temperature responsive element wherein a temperature responsive material is suspended in finely dispersed form in an otherwise transparent medium;

FIG. 9 is a graph showing the radiation transmission characteristics of both a variable filter and a constant filter under different temperature conditions, as a function of wave length;

FIG. 10 is a graph showing the variation in absorptivity and emissivity of two different types of temperature responsive surface coatings as a function of temperature;

FIG. 11 is a graph showing the variation in transmissivity of a temperature responsive surface coating as a function of temperature; and FIG. 12 is an enlarged, schematic representation of a house roof that is coated with a temperature responsive surface coating according to the invention for maintaining the temperature of the house uniform within a relatively narrow range.

The discussion herein describes the radiative characteristics of concern in physical terms. While these characteristics are often associated with accompanying changes which are physiologically perceived as color, the actual color or color changes are relatively unimportant for the purposes described herein. The changes in radiative characteristics of an element, as defined by its exhibited electromagnetic absorption, emission, reflection, and transmission (and not necessarily by its color), are the characteristics of importance herein.

FIG. 1 represents an arrangement of a space vehicle 10, such as an artificial satellite of a planet, with the satellite having surface portions which are subjected to wide differences in incident radiant energy. The satellite as a whole must nevertheless be maintained substantially constant in temperature. Such relatively wide temperature fluctuations may result, for example, from the periodic entry of the satellite into the shadow of the planet. The arrangement of the invention serves to lessen the magnitude of such fluctuations.

The vehicle 10 may be stabilized with respect to an x–x′ axis having a predetermined orientation with respect to the sun 12. Such an orientation of the vehicle 10 may be desirable in order to expose to the sun (or other radiating bodies) certain areas on the vehicle 10 which carry solar cells (not shown) for generating electrical power for use in the vehicle 10. These exposed surface areas are generally designated as surface areas or portions 14. In addition to the surface portions 14 which are exposed to the sun, there may be other surface portions, such as the surface portions 16, that are not exposed to appreciable radiant energy from the sun.

During the flight of the vehicle, the vehicle reaches and maintains an equilibrium temperature determined by the rate of absorption of incident electromagnetic radiation from the sun, and the rate of emission of electromagnetic energy from the vehicle surfaces. If either the distance of the vehicle 10 from the sun 12 or the orientation of the vehicle 10 changes, the state of equilibrium between the absorption of the incident electromagnetic radiation by the vehicle 10, and the emission of electromagnetic energy therefrom, will change. As a result, the temperature of the vehicle 10 will change. In accordance with the invention means are provided on the vehicle 10 for maintaining its temperature relatively constant within a narrow range despite relative changes in the radiation conditions to which the vehicle 10 is subjected.

Referring now to FIG. 2, in accordance with the invention those surface portions 14 of the vehicle 10 that are exposed to the sun are provided with a coating 18 of a substance which has a radiative characteristic that reversibly varies with temperature. In this instance the coating 18 exhibits a higher absorptivity characteristic at temperatures below a given transition temperature than at temperatures above the transition temperature. (This characteristic is shown as curve F in FIG. 10.) At a given instant of time assume that the vehicle 10 is at a given temperature which is below the transition temperature characterizing the coating 18. If the temperature of the vehicle 10 should rise above the transition temperature, the absorptivity characteristic of the coating 18 will decrease to a lower value (say from point 11 to point 13 on curve F of FIG. 10) so as to reduce the amount of incident electromagnetic radiation absorbed. This reduction in the absorption of the radiant energy by the coating 18 will have a tendency to minimize any further increase of the temperature of the vehicle 10 thereby limiting the extent to which the temperature of the vehicle 10 exceeds this transition temperature. On the other hand, if the temperature should fall back below the transition temperature, the coating 18 will revert to its original state. This causes an increase in the rate of absorption of incident electromagnetic radiation by the coating 18 (say back to point 11 in FIG. 10) and, correspondingly, gives rise to a tendency for the vehicle 10 to increase in temperature. In this way the increased rate of absorption limits the extent to which the temperature of the vehicle 10 drops below the transition temperature.

Various substances may be used for the temperature sensitive coating 18 to impart to the vehicle surfaces a decreasing electromagnetic radiation absorption characteristic with increasing temperature. One example is mercuric iodide ($HgI_2$) which has a relatively high absorptivity at room temperature, a transition temperature of about 126° centigrade, and an appreciably lower absorptivity above this temperature. Such substances may be mixed with a suitable paint medium and applied to the surface 14 as a paint. (While not material to the purposes of the invention, it might be added that mercuric iodide exhibits a red color below this transition temperature and exhibits a yellow color when this temperature is exceeded.)

In order to further aid in maintaining the vehicle 10 within the desired temperature range, a different radiative coating 20 (FIG. 3), may be applied to the vehicle surfaces 16 which, because of the physical orientation, do not receive an appreciable amount of radiation from the sun 12. The surfaces 16 are heated to temperatures substantially the same as those of the surfaces 14 facing the sun (by virtue of a high thermal conductivity throughout the vehicle). This coating 20 has a radiative characteristic opposite to that the of the coating 18 exposed to the sun. The coating 20 in this case has a higher emissivity at temperatures above the coating transition temperature than at temperatures below the transition temperature. (This is shown as curve G in FIG. 10.) Thus if the temperature of this other surface 16 should tend to rise above the transition temperature, the emissivity of the coating 20 will be increased. While the total absorptivity and emissivity are always numerically equal for an opaque surface, the resulting increase in emissivity by these surfaces 16 does not result in increased absorption of electromagnetic radiation since the surfaces 16 are not subjected to appreciable incident electromagnetic radiation. In this way the coating 20 prevents the temperature of the vehicle 10 from rising appreciably beyond that of the transition temperature. Conversely, if the temperature of the coating 20 falls below the transition temperature the coating 20 reverts to its low emissive state so that the rate of emission of radiation from the coating 20 is decreased. The decreased emissivity decreases the rate of heat loss from the vehicle 10 and thus limits the extent to which the temperature of the vehicle falls below the transition temperature.

One example of a substance which can be used for the reversible coating 20 is a double salt of mercuric iodide and silver iodide ($HgI_2 \cdot AgI$). This salt has a relatively low emissivity at a temperature below about 45° centigrade, a first transition temperature at about 45° centigrade (where the emissivity rises to an intermediate value), and a second transition temperature at about 90° centigrade, above which temperature the coating exhibits a high emissivity. (It might be added that this double salt also exhbits a yellow color at temperatures below about 45° centigrade, exhibits a relatively quick transition to a dark orange color at about 45° centigrade, and exhibits a carmine red color at about 90° centigrade.) Another substance which may be used is $\alpha$-phenyl-$\delta$-diphenylene fulgide, which has a relatively low emissivity (and a dark red color) at room temperature, a transition temperature at about 54° centigrade (where it appears purple), and an appreciably higher emissivity above this temperature. A third substance which may be used is $\alpha$-diphenylene-$\delta\delta$-diphenyl fulgide, which has a relatively low emissivity (and a red color) at room temperature, a transition temperature of about 76° centigrade (where it exhibits a dark blue color), and an appreciably higher emissivity above this temperature. A fourth example of a substance which may be used is a combination of 98 percent caproic acid and 2 percent iodeosine, as disclosed in U.S. Patent No. 2,261,473 to G. W. Jennings. This substance has a relatively low emissivity (and tan color) below about 8° centigrade, a transition temperature at about 8° centigrade, and an appreciably higher emissivity (and red color) at room temperature.

The graph of FIG. 4 illustrates the manner in which a temperature responsive coating is effective in maintaining a body at a temperature within a relatively narrow range while the body is exposed to wide variations in radiant energy. In the graph, the temperature of the body is plotted as a function of the total incident radiant energy received by the body. Curve A illustrates the variation in temperature of a body in the absence of a coating according to the invention, and curve B the variation in temperature of a body having a temperature responsive coating in accordance with the invention. As will be seen, in the absence of a coating (curve A) the temperature of the body rises steeply over the whole range of incident radiant energy. However, when the body is provided with a temperature responsive coating (curve B) having a given transition temperature (the transition temperature being indicated by the dashed horizontal line 21), the temperature of the body is maintained relatively constant in the vicinity of the transition temperature over a wide range of variations in incident radiant energy.

Although the temperature responsive coating may lose some of its effectiveness at very low or very high radiation levels, it is seen that even over the widest possible variations in incident radiant energy the range of temperature variation for the coated body is less than that for the uncoated body. Thus it is seen that the temperature of a body that is subjected to relatively wide variations in amounts of incident radiation can be controlled within relatively narrow limits by coating the body with materials whose radiant energy absorptivity and emissivity changes with temperature. It will now be shown how a similar kind of temperature control can be effected through the use of coatings which exhibit a change in transmissivity to radiant energy in response to temperature change.

In the arrangement shown in FIG. 5 the surface portions 14 that are exposed to the sun are provided with a first coating 22 that exhibits a relatively high absorptivity of incident radiant energy. Thus, for example, the coating 22 may be formed by painting the surface portions 14 mat black. The mat black, high absorptivity coating 22 is covered with a second coating 24 that has a variable transmissivity of radiant energy with changing temperature. In this case the variable transmission coating 24 is one of the kind that decreases its transmissivity with increasing temperature. (This characteristic is shown as curve H of FIG. 11). One example of a substance that may be used for the variable transmission coating 24 is a silver salt of allythiourethane, $CH_2:CH.CH_2.N:C(SAg)OC_2H_5$. The transmissivity characteristic of this substance is such that it is transparent to a relatively wide range of electromagnetic radiation (including the visible spectrum) at about 0° centigrade, but becomes reflectively opaque at about 30° centigrade. This substance may be mixed with a transparent medium, such as a transparent shellac, and applied to cover the black coating 22.

In the operation of the multiple coating arrangement shown in FIG. 5, if the equilibrium temperature of the vehicle 10 (FIG. 1) at a given instant of time is below the transition temperature of the variable transmission coating 24, which for the substance in the example given above is about 30° centigrade, the variable transmission coating 24 will be transparent to an appreciable portion of the incident electromagnetic radiation. Therefore, a relatively great amount of the electromagnetic energy that impinges upon the vehicle 10 will be transmitted through the variable transmission coating 24 and be received by the mat black surface coating 22. (In this instance the surface coating 22 can be considered as essentially a Planck black body.) Thus, the vehicle surface portions 14 (FIG. 1) exposed to the sun 12 will effectively have a relatively high absorptivity. Therefore, substantially all of the energy transmitted through the outer coating 24 and to the black body coating 22 will be absorbed by these surface portions 14.

If the temperature of the vehicle 10 rises above the transition temperature (about 30° centigrade), the variable transmission coating 24 becomes opaque and practically none of the impinging energy will be transmitted through the outer coating 24 to the black body coating 22. Instead, a greater portion of the energy impinging upon the outer coating 24 will be reflected therefrom. The amount of energy that will be absorbed by the now opaque outer coating will be appreciably less than that which the black body coating 22 absorbed when the outer coating 24 was substantially transparent. This reduction in the gross amount of energy absorbed will tend to limit the extent to which the temperature of the vehicle 10 exceeds the transition temperature.

Conversely, if the temperature of the vehicle 10 reverts to a temperature below the transition temperature of the variable transmission coating 24, the coating 24 will change from its relatively opaque state back to its original transparent state. The black body coating 22 will once again be exposed to incident electromagnetic radiation. The increased absorption of energy by the black body coating 22, as compared with the absorptivity of the outer coating 24 when the latter coating is in its higher temperature state (opaque), tends to increase the temperature of the vehicle 10. The increased absorption thereby limits the extent to which the temperature of the vehicle 10 falls below the transition temperature. Thus, the temperature of the vehicle is automatically maintained within a relatively narrow temperature range even under extreme variations in its radiant energy environment.

While the absorptive undercoating 22 in the embodiment of FIG. 5 has been described as being an essentially Planck black body surface, it is appreciated that other types of advantageous undercoating arrangements may be used. For example, in order to even further improve the operation of the embodiment described in FIG. 5, the undercoating 22 may be of a type such that, when the temperature of the vehicle falls below the transition temperature, the exposed undercoating selectively exhibits a relatively high absorptivity for solar radiation, and yet exhibits an appreciably lower emissivity in the infrared portion of the spectrum. While the discussion has up to this point been concerned with total absorptivity and total emissivity, the two always being equal, it is appreciated that at any given wave length the absorptivity may not be numerically equal to the emissivity. Materials are known that exhibit a relatively high absorptivity for solar radiation, and yet exhibit an appreciably lower emissivity in the infrared portion of the spectrum. (Such materials are commonly referred to as Tabor surface materials.) If the undercoating 22 is made of a Tabor surface material, the radiative response change with temperature will be greatly enhanced since heat dissipation (normally provided by a relatively great radiation in the infrared portion of the spectrum) will be greatly reduced at temperatures below the transition temperature of the outer coating 24. Among the Tabor surface materials useful for the purpose are those described by Tabor in the Bulletin of the Research Council of Israel, volume 5A, 1955, page 119 (electroplated nickel in the presence of zinc and sulphides on nickel plate or on aluminum), by Ungar in "The Preparation of a Selectively Black Surface for Use in the Collection of Solar Energy," Massachusetts Institute of Technology, Sc.D. Thesis, June 1958 (sprayed solution of cupric nitrate on a highly reflecting aluminum sheet), and by Hass and Bradford in the Journal of the Optical Society of America, February 1957, page 125 (vacuum deposited titanium). One Tabor surface material that proves especially useful, and has a solar energy absorptivity that is from about 30 to about 100 times greater than its long wave length (infrared) emissivity is made as follows: A substrate (for example of a plastic material known as Mylar, a polyester film made from polyethylene terephthalate—the polymer formed by the condensation reaction between ethylene glycol and terephthalic acid) is vacuum coated with an opaque layer of aluminum followed by the vacuum deposition of a layer of titanium of from about 800 to about 1000 Angstroms in thickness, with the deposition rate being about 800 to about 1000 Angstroms in about 12 seconds. Both depositions are effected with a single evacuation of the vacuum chamber, the evacuation being to about $10^{-4}$ millimeters of mercury (that is, a relatively poor vacuum by ordinary deposition standards). It has been found that a vacuum of greater than this is undesirable since too pure a coating is then obtained (with attendant undesirable spectral characteristics), and a vacuum poorer than about $10^{-4}$ millimeters of mercury is undesirable since it is difficult to realize any effective coating at such ambient pressures.

A different arrangement, shown in FIG. 6, is useful in maintaining the vehicle within the desired temperature range by control over the radiative characteristics of the vehicle surface portions 16 (FIG. 1) that are exposed to only a relatively small amount of incident electromagnetic radiation. In this arrangement of FIG. 6 the surface portions 16 are first given a highly polished coating 26. The coating 26 may comprise a polished metal coating, such as a coating of silver, aluminum, or other like highly reflecting metal. Due to its polished or highly reflective character the coating 26 will have a low emissivity (as well as a low absorptivity) of electromagnetic radiant energy. In such a case the reflective coating 26 is covered by a variable transmissivity coating 28, the variable transmissivity coating 28 being formed of a substance that changes from a transparent state to an opaque and highly emissive state as its temperature is raised above the transition temperature.

In the operation of the multiple coating arrangement of FIG. 6, if the equilibrium temperature of the vehicle 10 at a given instant of time is below the transition temperature of the variable transmissivity coating 28, the variable coating will be transparent. Hence the relatively low emissivity characteristic of the reflective coating 26 will govern the rate of heat dissipation from the vehicle 10 (FIG. 1). However, if the temperature of the vehicle 10 should rise above the transition temperature of the variable transmissivity coating 28, the coating 28 will change from a condition of transparency to one of opacity. The emissivity of the coating 28 in its higher temperature state will be relatively high as compared to the emissivity of the polished coating 26. Since the emissivity of the surface portions 16 will now be largely determined by the emissivity of the outer coating 28, the heat dissipation from the vehicle 10 (FIG. 1) will be increased.

The variable transmissivity coatings 24 and 28, of, respectively, FIGS. 5 and 6, have been exemplified in general terms with respect to certain materials. It is realized, however, that there are many other materials which may be substituted for the materials described, provided the radiative characteristics defined are realized in the selected materials. For example, a number of materials and arrangements which may be used to provide the effect of such variable transmissivity coatings are described in U.S. Patent 2,710,274, issued on June 7, 1955, to G. W. Kuehl. Thus, for example, as described in this patent, the variable transmissivity coating may take the form of a sandwich instead of a single layer coating. If a sandwich type construction is used instead of the single layer coating described above, the variable material may taken the form of one that changes state or phase with temperature. In such a case a change from a solid to liquid state, for example, would not be harmful since the outer layers of the sandwich would contain the active material between them. Furthermore, while the variable materials have been described as being reversible in character, it will be appreciated that there are uses for materials which are not reversible. For example, if a space vehicle launched from the earth is intended to take up an orbit in the vicinity of the planet Venus, the space vehicle would desirably have a greater heat retentivity characteristic while in the vicinity of the orbit of the earth (that is, when it is relatively remote from the sun) than when in the vicinity of the orbit of Venus (when it is relatively close to the sun). Accordingly, an irreversible temperature control arrangement would be useful since no further great change in radiative characteristics would be required once the space vehicle assumes an orbit in the vicinity of the orbit of Venus.

In yet another embodiment shown in FIG. 7, a temperature responsive coating 30 is applied to the vehicle surface portions 14 (FIG. 1) exposed to relatively large amounts of incident electromagnetic radiation, with the coating 30 being itself covered by a filter coating 32. The variable response coating 30 exhibits (for radiation within the band transmitted by the filter 32) different characteristics at different temperatures. The transmissivity characteristic of the filter coating 32, and the absorptivity and reflectivity characteristic of the temperature responsive coating 30 are related in a certain predetermined manner. The relationship is such that at temperatures above the transition temperature of the coating 30, incident electromagnetic radiation transmitted through the filter coating 32 is of such wave length as to be largely reflected by the temperature responsive coating 30. When this coating 30 falls below its transition temperature, however, its radiative characteristics change so that the temperature responsive coating 30 will largely absorb the transmitted electromagnetic radiation.

Since for an opaque body in thermal equilibrium all incident radiant energy that is not absorbed must be reflected, a high absorptivity implies a low reflectivity, and, correspondingly, a low absorptivity implies a high reflectivity. For example, a temperature responsive coating 30 of α-diphenylene-δδ-diphenyl fulgide, at temperatures below its transition temperature, has a relatively high absorption coefficient for incident electromagnetic radiation in a region including that between approximately 0.47 and 0.48 micron (which lies in the blue portion of the visible spectrum). This temperature responsive coating 30 can be combined with a filter coating 32 which has a maximum transmission at 0.475 micron. If the temperature increases above the transition temperature of the coating 30, the coating 30 changes to a state exhibiting a relatively low absorptivity for incident radiation of a wave length between approximately 0.47 and 0.48 micron, with a consequent high reflectivity. This limits the rate of temperature rise. If the temperature of the coating 30 reverts to that below the transition temperature, the coating changes back to its original high absorptivity—low reflectivity state and will absorb the electromagnetic radiation passing through the coating 32, thereby causing the temperature to increase.

In the embodiment shown in FIG. 8, a material 34 that exhibits a change in wave length of transmitted electromagnetic radiation with change in temperature is suspended in a finely dispersed form in an otherwise transparent medium 36, such as glass or plastic; this material acts as a filter 33 whose radiation transmission characteristic is dependent upon temperature. Such a coating is applied to a substrate 40 whose temperature is to be controlled. The characteristics of the filter coating 33 may be such that at high temperatures the filter coating transmits, for example, only radiation at a wave length of about 0.68 micron, but at an appreciably lower temperature it transmits only radiation of about 0.64 micron. The transmissivity characteristic of the variable filter coating 33 is illustrated in the graph of FIG. 9, this graph being a series of curves C and D plotting transmissivity as a function of wave length. Curve C is the characteristic curve representing the transmission of the filter coating at temperatures below the transition temperature, the transmission being at a maximum at about 0.64 micron. Curve D is the characteristic curve representing the transmission of the filter coating at temperatures above the transition temperature, the transmission here being at a maximum at about 0.68 micron.

A second filter coating 38, having a fixed transmissivity characteristic, covers the variable filter coating 33. The fixed filter coating 38 has a transmissivity characteristic which coincides with that of the variable filter coating at substantially only one temperature. In this example the second coating 38 has transmission that is a maximum at about 0.64 micron, which coincides with the 0.64 micron peak of the variable filter coating when the latter is in its lower temperature state. The transmissivity characteristic of the fixed filter coating is represented by curve E in FIG. 9.

At low temperatures both of the filters 33 and 38 transmit the same wave lengths so that the transmission to the substrate 40 is at a maximum. If the temperature of the substrate 40 exceeds the transition temperature of the temperature responsive filter 33, the peak transmission characteristic of this filter changes or shifts from 0.64 micron (curve C of FIG. 9) to 0.68 micron (curve D). Since the transmission of the two filters (represented by curves C and D) are at appreciably different spectral regions, only a small amount of incident radiation will be absorbed. Consequently, the temperature of the substrate 40 (FIG. 8) will tend to decrease accordingly, thereby limiting the extent of rise in temperature.

The multiple filter coatings of the kind described above in connection with FIG. 8 can also be used in photographic applications to serve as an automatic shutter. For example, some superfast photographic films are so extremely light sensitive as to make them ordinarily unsuitable for picture-taking in sunlight, although they are quite effective for picture-taking in other low light level environments. The reason of this is that ordinary cameras can not usually be stopped down enough to accommodate the high light intensities presented by sunlight when the camera is used with the superfast film. The use of the variable light transmission filter described reduces the dynamic range of the light presented to the film, and hence enables such film to accommodate bright sunlight as well as the low light intensity environments for which it was originally intended.

While the invention has been disclosed as applied primarily to controlling the temperature of a satellite or other space vehicle, it may also be used in many earthly environments. For example, the arrangement of the invention may be used to coat the roof of a house trailer, an automobile, or of a building such as a factory or home. If the material is such that it does not absorb appreciable electromagnetic radiation when warm, but acts in an opposite manner when cool, it would serve to reduce air conditioning requirements in hot weather and heating requirements in cold weather. Other uses for the arrangement of the invention are feasible in clothing, where clothing having an outer surface of such temperature responsive material may serve to make the wearer cool in hot weather and warm in cool weather.

Other substances useful in obtaining variations in radiative characteristics with temperature can also be utilized to effect temperature control of a body. For example, as indicated above, a substance that undergoes phase changes (that is between liquid and solid) may be used. An example of this would be water where it has a high transmissivity for most wave lengths in the liquid state, but becomes opaque and highly reflective in the solid state. These substances, of course, must be contained (as by means of the sandwich method referred to, and described in greater detail below) in order to maintain contact with the body whose temperature is to be controlled. Other substances which change their radiative characteristics in response to temperature, but do so in an irreversible manner, can also be utilized; for example, where the body whose temperature is to be controlled will first be subjected to one set of environmental conditions and finally to another set of environmental conditions, the second set being quite dissimilar than the first. Other substances which change radiative characteristics with temperature, in one direction, but require the addition of some material to effect the change back to its original state, may also be used. In many instances the other substances necessary to effect the change back is water in either the liquid or the vapor form.

The use of change-in-phase temperature-responsive materials is illustrated in FIG. 12. A roof 42 of a house or house trailer may be provided with a reversibly changeable surface coating 44 (made up of a number of layers 46, 48, 50, and 52, described below) that absorbs a lesser amount of radiant energy when heated than when cool. Such a roof will be heated on being subjected to exposure to sunlight. The heating will give rise to a change in its radiative characteristic such that it will absorb a small portion of the incident radiant energy, thus minimizing the temperature rise of the roof. If the roof later is subjected to shade, its temperature will drop until it again reaches the critical temperature where the coating changes to its high absorptivity state.

The roof 42 in FIG. 12 is covered with a multi-layered surface coating 44 that tends to heat the roof in cold weather but tends to keep the roof from being overheated in hot weather. The coating 44 includes a polymer material 46 that is reversibly convertible to and from a gel state, and thus from a transmissive to a reflective state, depending upon its temperature. This material 46 is contained within a pair of transparent members 48 and 50, which may for example be made of a transparent plastic, with the sandwich being mounted adjacent to a black body coating 52. The temperature responsive material 46 may be any of the appropriate substances described in the aforementioned Kuehl patent, and may for example be made up of a mixture consisting of 3.2 grams methyl polyvinyl ether, 1.5 grams emulsifying agent, 100 cubic centimeters glycerol, 6 grams agar-agar, and 269 cubic centimeters water. The thickness of the layer of material 46 is of the order of .5 millimeter, and is opaque and highly reflective at temperatures below about 65 to 70 degrees Fahrenheit. Upon reaching this temperature range the mixture changes from a generally transparent form to a generally opaque and reflective form for the bulk of the radiation received from the sun. In operation, when the coating 44 is at a temperature below around 65 degrees Fahrenheit, the radiation (indicated by dot-dash line 56) from the sun passes through the now generally transparent layer 46, impinges upon the black body coating 52 and is absorbed by it, thereby tending to heat the roof 42. When the temperature is above about 70 degrees Fahrenheit, the layer 46 will be transformed into its generally reflective state, and radiation (indicated by dashed line 54) from the sun will be reflected from this layer, thereby minimizing the temperature rise of the roof 42. In order to minimize the radiant energy absorption by the layer 46, it is preferably made as thin as possible and is preferably of a material that is highly reflective in its opaque state. In practicing the invention it is desirable to assure that the changes in radiation transmission of the coating 44 are dependent primarily upon the temperature of the body, rather than upon surface heating phenomena. Therefore, unlike the teachings in the Kuehl patent referred to, the temperature responsive material should here be mounted in good thermally conductive contact with the rest of the body in order to prevent local heating (by incident radiation) to a temperature appreciably different from that of the rest of the body whose temperature is to be controlled.

If any of the substances referred to herein exhibit deleterious characteristics under certain environmental conditions, for example, degassing at very low ambient pressures, they may be coated with a suitable transparent coating to protect them from such an environment and yet still leave their basic temperature response characteristics unaffected. Such a protective coating may be made of a material such as some of the transparent plastics (such as polystyrene).

Furthermore, while the temperature responsive materials used in practicing the invention have been described as being in a permanent form, such as in the form of paint-like or sandwich-like coatings, it will be appreciated that the invention may be embodied in other forms of coatings, either permanent or temporary. For example, temperature responsive materials may be included as one of the principal ingredients in a polish or waxing compound useful in treating the exterior surfaces of automobiles or house trailers.

From the foregoing it is seen that this invention not only provides an improved method and apparatus for controlling the temperature of a body subjected to wide variations in incident radiant energy, but also provides an arrangement that is free of mechanical devices and power consuming arrangements.

What is claimed is:

1. In a space vehicle having certain outer surfaces oriented to receive varying amounts of incident radiant energy and other outer surfaces not exposed to appreciable radiant energy, the improvement comprising:
   (A) said certain outer surfaces being provided with a first energy absorptive coating, said coating having a transition temperature with a higher absorptivity at temperatures below said transition temperature than at temperatures above said transition temperature;
   (B) said other outer surfaces being provided with a second energy emissive coating, said coating having a transition temperature with a higher emissivity at temperatures above said transition temperature than at temperatures below said transition temperature;
   (C) whereby the temperature inside of said vehicle is maintained within a desired temperature range.

2. In a space vehicle having certain outer surfaces oriented to receive varying amounts of incident radiant energy and other outer surfaces not exposed to appreciable radiant energy, the improvement comprising:
   (A) said certain outer surfaces being provided with a first energy absorptive coating, said coating having a transition temperature with a higher absorptivity at temperatures below said transition temperature than at temperatures above said transition temperature, said first coating including
      (1) a first layer having high absorptivity for solar radiation, and low emissivity for infrared radiation,
      (2) a second layer having a variable transmissivity which decreases as the temperature increases;
   (B) said other outer surfaces being provided with a second energy emissive coating, said coating having a transition temperature with a higher emissivity at temperatures above said transition temperature than at temperatures below said transition temperature, said second coating including
      (1) a first layer having a highly reflective character,
      (2) a second layer having a variable transmissivity which decreases as the temperature increases;
   (C) whereby the temperature inside of said vehicle is maintained within a desired temperature range.

3. In a space vehicle having certain outer surfaces oriented to receive varying amounts of incident radiant energy and other outer surfaces not exposed to appreciable radiant energy, the improvement comprising:
   (A) said certain outer surfaces being provided with a first energy absorptive coating, said coating having a transition temperature with a higher absorptivity at temperatures below said transition temperature than at temperatures above said transition temperature, said first coating including
      (1) a first Tabor surface layer having high absorptivity for solar radiation, and low emissivity for infrared radiation,
      (2) a second layer having a variable transmissivity which decreases as the temperature increases;
   (B) said other outer surfaces being provided with a second energy emissive coating, said coating having a transition temperature with a higher emissivity at temperatures above said transition temperature than at temperatures below said transition temperature, said second coating including
      (1) a first layer having a highly reflective character,
      (2) a second layer having a variable transmissivity which decreases as the temperature increases;
   (C) whereby the temperature inside of said vehicle is maintained within a desired temperature range.

4. In a space vehicle having certain outer surfaces oriented to receive varying amounts of incident radiant energy and other outer surfaces not exposed to appreciable radiant energy, the improvement comprising:
   (A) said certain outer surfaces being provided with a first energy absorptive coating, said coating having a transition temperature with a higher absorptivity at temperatures below said transition temperature than at temperatures above said transition temperature, said first coating including
      (1) a first mat black layer having high absorptivity for solar radiation, and low emissivity for infrared radiation,
(2) a second layer having a variable transmissivity which decreases as the temperature increases;
(B) said other outer surfaces being provided with a second energy emissive coating, said coating having a transition temperature with a higher emissivity at temperatures above said transition temperature than at temperatures below said transition temperature, said second coating including
(1) a first layer having a highly reflective character,
(2) a second layer having a variable transmissivity which decreases as the temperature increases;
(C) whereby the temperature inside of said vehicle is maintained within a desired temperature range.

5. In a space vehicle having certain outer surfaces oriented to receive varying amounts of incident radiant energy and other outer surfaces not exposed to appreciable radiant energy, the improvement comprising:
(A) said certain outer surfaces being provided with a first energy absorptive coating, said coating having a transition temperature with a higher absorptivity at temperatures below said transition temperature than at temperatures above said transition temperature, said first coating including
(1) a first layer having high absorptivity for solar radiation, and low emissivity for infrared radiation,
(2) a second layer having a variable transmissivity which decreases as the temperature increases;
(B) said other outer surfaces being provided with a second energy emissive coating, said coating having a transition temperature with a higher emissivity at temperatures above said transition temperature than at temperatures below said transition temperature, said second coating including
(1) a first polished metallic layer having a highly reflective character,
(2) a second layer having a variable transmissivity which decreases as the temperature increases;
(C) whereby the temperature inside of said vehicle is maintained within a desired temperature range.

6. In a space vehicle having certain outer surfaces oriented to receive varying amounts of incident radiant energy and other outer surfaces not exposed to appreciable radiant energy, the improvement comprising:
(A) said certain outer surfaces being provided with a first energy absorptive coating, said coating having a transition temperature with a higher absorptivity at temperatures below said transition temperature than at temperatures above said transition temperature, said first coating including
(1) a first layer having a variable absorptivity at one wavelength such that the absorptivity is relatively high at one temperature and substantially lower at a higher temperature,
(2) a second constant filter layer which transmits energy primarily at said one wavelength only;
(B) said other outer surfaces being provided with a second energy emissive coating, said coating having a transition temperature with a higher emissivity at temperatures above said transition temperature than at temperatures below said transition temperature;
(C) whereby the temperature inside of said vehicle is maintained within a desired temperature range.

7. In a space vehicle having certain outer surfaces oriented to receive varying amounts of incident radiant energy and other outer surfaces not exposed to appreciable radiant energy, the improvement comprising:
(A) said certain outer surfaces being provided with a first energy absorptive coating, said coating having a transition temperature with a higher absorptivity at temperatures below said transition temperature than at temperatures above said transition temperature, said first coating including
(1) a first variable filter layer having a variable transmissivity such that radiant energy at one wavelength is primarily transmitted at one temperature and radiant energy at another wavelength is primarily transmitted at a higher temperature,
(2) a second constant filter layer which transmits energy primarily at said one wavelength only;
(B) said other outer surfaces being provided with a second energy emissive coating, said coating having a transition temperature with a higher emissivity at temperatures above said transition temperature than at temperatures below said transition temperature;
(C) whereby the temperature inside of said vehicle is maintained within a desired temperature range.

8. In a space vehicle having certain outer surfaces oriented to receive varying amounts of incident radiant energy and other outer surfaces not exposed to appreciable radiant energy, the improvement comprising:
(A) said certain outer surfaces being provided with a first energy absorptive coating, said coating having a transition temperature with a higher absorptivity at temperatures below said transition temperature than at temperatures above said transition temperature, said first coating comprising a material selected from the group consisting of
(1) mercuric iodide,
(2) a silver salt of allythiourethane;
(B) said other outer surfaces being provided with a second energy emissive coating, said coating having a transition temperature with a higher emissivity at temperatures above said transition temperature than at temperatures below said transition temperature, said second coating comprising a material selected from the group consisting of
(1) the double salt of mercuric iodide and silver iodide,
(2) $\alpha$ phenyl $\delta$ diphenylene fulgide,
(3) $\alpha$ diphenylene $\delta$ diphenyl fulgide,
(4) 98% caproic acid and 2% iodeosine;
(C) whereby the temperature inside of said vehicle is maintained within a desired temperature range.

9. In a space vehicle having an outer surface oriented to receive varying amounts of incident radiant energy, the improvement comprising:
(A) said outer surface being provided with an energy absorptive coating, said coating having a transition temperature with a higher absorptivity at temperatures below said transition temperature than at temperatures above said transition temperature;
(B) whereby the temperature inside of said vehicle is maintained within a desired temperature range.

10. In a space vehicle having an outer surface not exposed to appreciable radiant energy, the improvement comprising:
(A) said outer surface being provided with an energy emissive coating, said coating having a transition temperature with a higher emissivity at temperatures above said transition temperature than at temperatures below said transition temperature;
(B) whereby the temperature inside of said vehicle is maintained within a desired temperature range.

11. In a space vehicle having an outer surface oriented to receive varying amounts of incident radiant energy, the improvement comprising:
(A) said outer surface being provided with an energy absorptive coating, said coating having a transition temperature with a higher absorptivity at temperatures below said transition temperature than at temperatures above said transition temperature, said first coating including
- (1) a first layer having high absorptivity for solar radiation, and low emissivity for infrared radiation,
- (2) a second layer having a variable transmissivity which decreases as the temperature increases;

(B) whereby the temperature inside of said vehicle is maintained within a desired temperature range.

12. In a space vehicle having an outer surface oriented to receive varying amounts of incident radiant energy, the improvement comprising:

(A) said outer surface being provided with an energy absorptive coating, said coating having a transition temperature with a higher absorptivity at temperatures below said transition temperature than at temperatures above said transition temperature, said first coating including
- (1) a first Tabor surface layer having high absorptivity for solar radiation, and low emissivity for infrared radiation,
- (2) a second layer having a variable transmissivity which decreases as the temperature increases;

(B) whereby the temperature inside of said vehicle is maintained within a desired temperature range.

13. In a space vehicle having an outer surface oriented to receive varying amounts of incident radiant energy, the improvement comprising:

(A) said outer surface being provided with an energy absorptive coating, said coating having a transition temperature with a higher absorptivity at temperatures below said transition temperature than at temperatures above said transition temperature, said first coating including
- (1) a first black mat layer having high absorptivity for solar radiation, and low emissivity for infrared radiation,
- (2) a second layer having a variable transmissivity which decreases as the temperature increases;

(B) whereby the temperature inside of said vehicle is maintained within a desired temperature range.

14. In a space vehicle having an outer surface not exposed to appreciable radiant energy, the improvement comprising:

(A) said outer surface being provided with an energy emissive coating, said coating having a transition temperature with a higher emissivity at temperatures above said transition temperature than at temperatures below said transition temperature; said coating including
- (1) a first polished metallic layer having a highly reflective character,
- (2) a second layer having a variable transmissivity which decreases as the temperature increases;

(B) whereby the temperature inside of said vehicle is maintained within a desired temperature range.

15. In a space vehicle having an outer surface oriented to receive varying amounts of incident radiant energy, the improvement comprising:

(A) said outer surface being provided with an energy absorptive coating, said coating having a transition temperature with a higher absorptivity at temperatures below said transition temperature than at temperatures above said transition temperature, said first coating including
- (1) a first layer having a variable absorptivity at one wavelength such that the absorptivity is higher at temperatures below its transition temperature than at temperatures above the transition temperature,
- (2) a second constant filter layer which transmits energy primarily at said one wavelength only;

(B) whereby the temperature inside of said vehicle is maintained within a desired temperature range.

16. In a space vehicle having an outer surface oriented to receive varying amounts of incident radiant energy, the improvement comprising:

(A) said outer surface being provided with an energy absorptive coating, said coating having a transition temperature with a higher absorptivity at temperatures below said transition temperature than at temperatures above said transition temperature, said first coating including
- (1) a first variable filter layer having a variable transmissivity such that radiant energy at one wavelength is primarily transmitted at one temperature and radiant energy at another wavelength is primarily transmitted at a higher temperature,
- (2) a second constant filter layer which transmits energy primarily at said one wavelength only;

(B) whereby the temperature inside said vehicle is maintained within a desired temperature range.

17. In a space vehicle having an outer surface oriented to receive varying amounts of incident radiant energy, the improvement comprising:

(A) said outer surface being provided with an energy emissive coating, said coating having a transition temperature with a higher absorptivity at temperatures below said transition temperature than at temperatures above said transition temperature, said coating comprising a material selected from the group consisting of
- (1) mercuric iodide,
- (2) a silver salt of allythiourethane;

(B) whereby the temperature inside of said vehicle is maintained within a desired temperature range.

18. In a space vehicle having an outer surface not exposed to appreciable radiant energy, the improvement comprising:

(A) said outer surfaces being provided with an energy emissive coating, said coating having a transition temperature with a higher emissivity at temperatures above said transition temperature than at temperatures below said transition temperature, said coating comprising a material selected from the group consisting of
- (1) the double salt of mercuric iodide and silver iodide,
- (2) α phenyl δ diphenylene fulgide,
- (3) α diphenylene δδ diphenyl fulgide,
- (4) 98% caproic acid and 2% iodeosine;

(B) whereby the temperature inside of said vehicle is maintained within a desired temperature range.

References Cited by the Examiner

UNITED STATES PATENTS

| | | | |
|---|---|---|---|
| 2,397,929 | 4/46 | Dimmick | 117—69 X |
| 2,462,952 | 3/49 | Dunkak | 55—208 |
| 2,501,418 | 3/50 | Snowden | 88—61 X |
| 2,564,708 | 8/51 | Mochel | 117—33.3 |
| 2,710,274 | 6/55 | Kuehl | 117—33.3 |
| 2,761,797 | 9/56 | Young | 117—33.3 X |
| 2,824,235 | 2/58 | Hahn et al. | 250—83.3 |
| 2,917,817 | 12/59 | Tabor. | |
| 2,945,305 | 7/60 | Strickler | 117—33.3 X |
| 2,992,426 | 7/61 | Borcherdt. | |

CHARLES SUKALO, *Primary Examiner.*

MILTON BUCHLER, HERBERT L. MARTIN, PERCY L. PATRICK, *Examiners.*